(12) United States Patent
Chen

(10) Patent No.: US 9,983,842 B2
(45) Date of Patent: May 29, 2018

(54) ADJUSTING METHOD AND ELECTRONIC DEVICE

(71) Applicant: LENOVO (BEIJING) LIMITED, Beijing (CN)

(72) Inventor: Jianfeng Chen, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 77 days.

(21) Appl. No.: 14/744,537

(22) Filed: Jun. 19, 2015

(65) Prior Publication Data

US 2016/0259617 A1    Sep. 8, 2016

(30) Foreign Application Priority Data

Mar. 2, 2015  (CN) .......................... 2015 1 0093633

(51) Int. Cl.
*G06F 3/14*    (2006.01)
*G06F 3/147*   (2006.01)
*G09G 5/12*    (2006.01)

(52) U.S. Cl.
CPC ............ *G06F 3/1446* (2013.01); *G06F 3/147* (2013.01); *G06F 3/1462* (2013.01); *G09G 5/12* (2013.01); *G09G 2300/026* (2013.01); *G09G 2320/103* (2013.01); *G09G 2370/04* (2013.01); *G09G 2380/02* (2013.01)

(58) Field of Classification Search
None
See application file for complete search history.

(56) References Cited

U.S. PATENT DOCUMENTS

| 8,860,656 | B1 * | 10/2014 | Cho ...................... G06F 3/041 345/1.1 |
| 9,646,407 | B2 * | 5/2017 | Lee ........................ G06F 3/041 |
| 2010/0053469 | A1 * | 3/2010 | Choi ................... H04N 5/4403 348/734 |
| 2013/0300686 | A1 * | 11/2013 | Yoon ..................... G06F 3/041 345/173 |
| 2014/0191950 | A1 * | 7/2014 | Park ..................... H04W 8/005 345/156 |
| 2015/0187325 | A1 * | 7/2015 | Yeo ..................... H04N 5/4403 345/156 |
| 2016/0259613 | A1 * | 9/2016 | Chen ..................... G06F 3/147 |

FOREIGN PATENT DOCUMENTS

CN    104079980 A    10/2014

OTHER PUBLICATIONS

Abstract of Chinese application CN104079980, Oct. 1, 2014, p. 1.

* cited by examiner

*Primary Examiner* — Joseph Haley
*Assistant Examiner* — Emily Frank

(57) ABSTRACT

The disclosure provides an adjusting method and an electronic device. The method comprises: acquiring a first shape parameter of a first foldable screen; and transmitting the first shape parameter to a second electronic device coupled to the first electronic device, so as to allow the second electronic device to adjust a shape of a second foldable screen of the second electronic device based on the first shape parameter, or generating first synchronization information based on the first shape parameter and transmitting the first synchronization information to the second electronic device coupled to the first electronic device, so as to allow the second electronic device to adjust the shape of the second foldable screen based on the first synchronization information.

12 Claims, 3 Drawing Sheets

ADJUSTING METHOD AND ELECTRONIC DEVICE

This application claims priority from CN Patent Application No. 201510093633.6, filed on Mar. 2, 2015, which is incorporated herein by reference in its entirety.

TECHNICAL FIELD

The disclosure generally relates to the field of computer technology and, more particularly, to an adjusting method and an electronic device.

BACKGROUND

Performance and appearance of electronic products have been greatly enhanced. Among others, the advent of curved screen electronic device such as television draws people's intense attention. Due to the change of arc angle over a curved screen of the electronic device, a viewer is at the same distance from all pixels on the curved screen when viewing content on the electronic device. As a result, visual distortion at edges of the screen is eliminated and the most natural and comfortable visual perception is achieved. Accordingly, the electronic device with the curved screen has gradually become a main choice for most families.

Currently, a display screen of the conventional electronic device with the curved screen has a curved shape that is fixed, thus the user cannot freely change an angle (in radians or in degrees), etc. of the curvature of the screen. Consequently, the user perceived viewing quality is poor in certain scenarios. For example, when the user is close to the screen, a small arc angle of the curvature of the curved screen tends to cause vision fatigue. There are also electronic devices with the curved screen that can be manually adjusted. Before viewing content on such an electronic device, a user has to adjust the curved shape of the display screen of the electronic device so that the display screen can be adjusted to a curved shape which satisfies the current viewing requirements. However, because it is difficult for a user to accurately assess the selected curved shape of the display screen as the user adjusts the arc angle of the curvature of the display screen, the adjustment is less accurate and it is hard to achieve a good displaying effect. In addition, for a curved screen that can be adjusted only a limited number of times, its life span will be shortened as the curved screen is adjusted again and again.

In view of the foregoing, a technical problem in the art is the low efficiency in adjusting the curved screen of an electronic device.

SUMMARY

Embodiments of the disclosure provide an adjusting method and an electronic device to solve the prior art technical problem of low efficiency in adjusting a curved screen of an electronic device and to achieve the technical effect of improving the efficiency of adjusting the curved screen of the electronic device.

An embodiment provides an adjusting method comprising:

acquiring a first shape parameter of a first foldable screen of a first electronic device; and transmitting the first shape parameter to a second electronic device coupled to the first electronic device, so as to allow the second electronic device to adjust a shape of a second foldable screen of the second electronic device based on the first shape parameter, or generating first synchronization information based on the first shape parameter and transmitting the first synchronization information to the second electronic device coupled to the first electronic device, so as to allow the second electronic device to adjust the shape of the second foldable screen based on the first synchronization information.

An embodiment provides an adjusting method comprising:

receiving a first shape parameter or first synchronization information from a first electronic device coupled to a second electronic device, wherein the first shape parameter is a control parameter for a first foldable screen of the first electronic device when the first foldable screen is in a first shape and the first synchronization information is generated based on the first shape parameter of the first foldable screen of the first electronic device;

adjusting a shape of a second foldable screen of the second electronic device based on the first shape parameter or the first synchronization parameter.

An embodiment provides a first electronic device including a first foldable screen. The first electronic device comprises:

a first acquiring unit configured to acquire a first shape parameter of the first foldable screen; and a processing unit configured to transmit the first shape parameter to a second electronic device coupled to the first electronic device, so as to allow the second electronic device to adjust a shape of a second foldable screen of the second electronic device based on the first shape parameter, or generate first synchronization information based on the first shape parameter and transmit the first synchronization information to the second electronic device coupled to the first electronic device, so as to allow the second electronic device to adjust the shape of the second foldable screen based on the first synchronization information.

An embodiment provides a second electronic device including a second foldable screen. The second electronic device comprises:

a receiving unit configured to receive a first shape parameter or first synchronization information from a first electronic device coupled to the second electronic device, wherein the first shape parameter is a control parameter for a first foldable screen of the first electronic device when the first foldable screen is in a first shape and the first synchronization information is generated based on the first shape parameter of the first foldable screen of the first electronic device;

a processing unit configured to adjust a shape of the second foldable screen based on the first shape parameter or the first synchronization parameter.

According to the embodiments of the disclosure, the first electronic device and the second electronic device each has a foldable screen and the first electronic device and the second electronic device are coupled to each other. When the first electronic device transmits a first shape parameter of its first foldable screen to the second electronic device when it acquires the parameter, the second electronic device can adjust its second foldable screen accordingly. Alternatively, after acquiring the first shape parameter, the first electronic device may generate first synchronization information, which may include an adjusting parameter (such as an arc angle of curvature, etc.) for adjusting the second foldable screen, based on the first shape parameter. Then, the first electronic device transmits the first synchronization information to the second electronic device, so as to allow the second electronic device to adjust the shape of the second foldable screen based on the first synchronization information. As such, by acquiring the shape parameter of the foldable screen of the first electronic device, the foldable screen of the second electronic device can adjusted accordingly. Thus, when it is needed to adjust the curved screen of an electronic device, the flexible screen of a handset connected to the electronic device is adjusted to an appropriate shape, and then based on a corresponding shape parameter the electronic device with the curved screen is controlled to automatically adjust its curved screen to a corresponding shape, so that the electronic device may provide a good displaying effect for its user. In this manner, the adjustment produces an accurate result while the number of times the curved screen is directly adjusted is reduced, and therefore the efficiency of the adjustment is high.

DETAILED DESCRIPTION OF EMBODIMENTS

An embodiment of the disclosure provides an adjusting method comprising: acquiring a first shape parameter of a first foldable screen of a first electronic device; and transmitting the first shape parameter to a second electronic device coupled to the first electronic device, so as to allow the second electronic device to adjust a shape of a second foldable screen of the second electronic device based on the first shape parameter, or generating first synchronization information based on the first shape parameter and transmitting the first synchronization information to the second electronic device coupled to the first electronic device, so as to allow the second electronic device to adjust the shape of the second foldable screen based on the first synchronization information.

In order to make the objects, solutions and advantages of embodiments of the disclosure more obvious, technical solutions according to the embodiments will be described clearly and thoroughly in the following in conjunction with drawings in the embodiments. Apparently, the embodiments described here are just embodiments of the disclosure. All other embodiments that can be conceived of by those skilled in the art without making creative efforts fall within the protective scope of the disclosure.

The term "and/or" as used herein just describes an association between objects and may denote three kinds of relationships. For example, A and/or B may refer to A, B or both of them. In addition, the character "/" as used herein generally denotes a logical OR relationship between two objects before and after the character.

In the following, embodiments of the disclosure will be described in detail in conjunction with drawings.

First Embodiment

Figure 1:
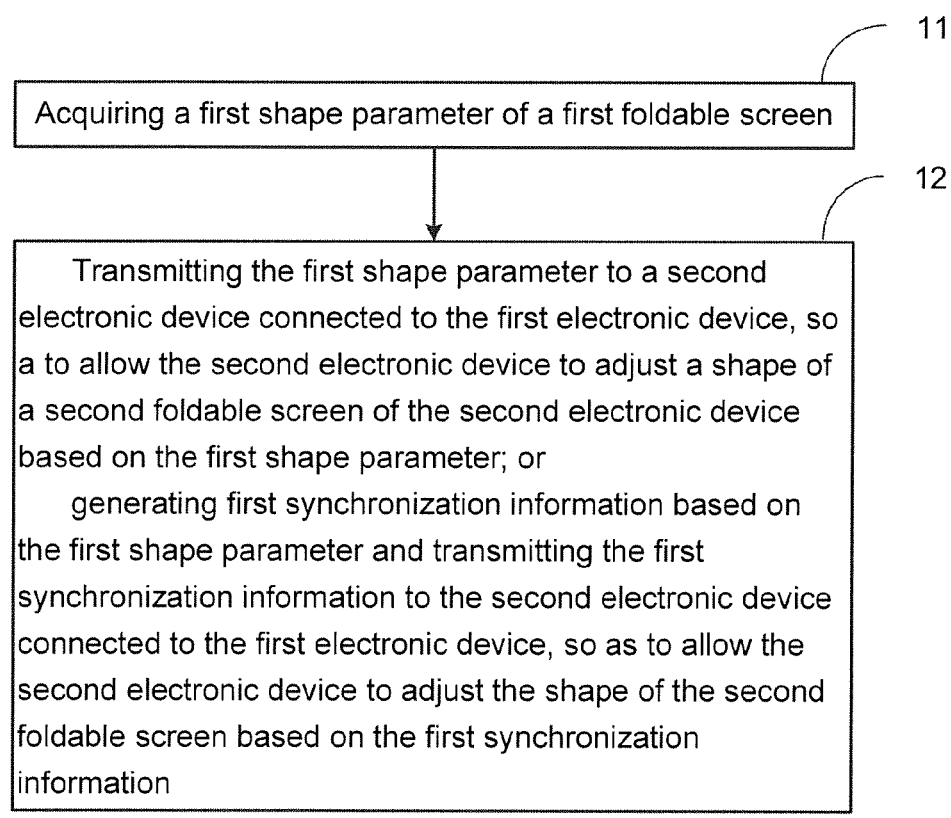
FIG. 1 is a flowchart illustrating an adjusting method according to a first embodiment of the disclosure.

Referring to FIG. 1, the embodiment provides an adjusting method which may be applied to a first electronic device including a first foldable screen. The method may comprise:

at step 11, acquiring a first shape parameter of the first foldable screen.

In the embodiment of the disclosure, the foldable screen may refer to a flexible screen employing an Organic Light-Emitting Diode (OLED) displaying technology. The OLED displaying technology is characterized by self-light emitting, and uses a very thin coating of organic material which emits light when a current flows through it. Meanwhile, an OLED display screen has a large viewing angle and can save electrical power. Therefore, in the embodiment of the disclosure, both the first foldable screen and the second foldable screen may be flexible screens that employ the OLED technology.

Optionally, in the embodiment of the disclosure, the first electronic device may be a flexible screen handset with a flexible display screen that is bendable and has a good flexibility while the second electronic device may be a television with a flexible screen (for example, a curved screen television), for example. The first electronic device and the second electronic device may be coupled with each other via a wireless connection (such as Internet, WIFI, etc.) or a wired connection. In the follows, the embodiments of the disclosure are described by taking the flexible screen handset with a flexible display screen as an example of the first electronic device, and taking the curved screen television as an example of the second electronic device. Those skilled in the art may conceive the first and second electronic device may be any product or component with a flexible display screen, including but not limited to an electronic paper, a handset, a tablet computer, a television, a notebook computer, a digital photo frame, a navigator, etc.

In the embodiment of the disclosure, the acquired first shape parameter may refer to a parameter of the flexible screen of the flexible screen handset when the flexible screen is in a certain shape, such as an arc angle (in radians or in degrees), an arc length, etc. of the curvature of the screen.

Optionally, in the embodiment of the disclosure, the method may further comprise, before the first shape parameter of the first foldable screen of the first electronic device is acquired, receiving a first synchronization adjusting instruction; and acquiring a first image of a picture currently displayed by the second electronic device based on the first synchronization adjusting instruction, and displaying the first image on the first foldable screen.

The first synchronization control instruction may be a control instruction from the second electronic device to acquire the shape parameter of the foldable screen of the first electronic device. Alternatively, the first synchronization control instruction may be from a control apparatus connected to the first electronic device and/or the second electronic device. For example, the synchronization control instruction may be issued by an infrared remote controller, in order to control the flexible screen handset to acquire a first image on the curved screen television. The, the parameter to be synchronized is determined by adjusting the first foldable screen.

Optionally, in the embodiment of the disclosure, the first image may be a displayed image corresponding to content currently displayed by the curved screen television. In practice, the first electronic device may acquire one or more images corresponding to the content currently displayed on the second foldable screen in real time or at a preset time interval. According to an image property of the acquired image, a displaying property of the currently displayed content can be determined as, for example, natural scenery, sport event, stage performance, etc. Then, according to displaying property, the first electronic device may be controlled to output corresponding prompt information, which can prompt the user to perform an accurate adjustment by suggesting a reference adjustment arc angle corresponding to the displaying property. For example, if the currently displayed content is a sport event, then the suggested reference adjustment arc angle may be $\pi/4$.

Preferably, the acquiring the first shape parameter of the first foldable screen may comprise the steps of:

a. detecting a first operation for adjusting the shape of the first foldable screen of the first electronic device;

b. in response to the first operation, determining the first shape parameter of the first foldable screen being in a first shape, wherein the first shape is a curved shape into which the first foldable screen is formed under the action of the first operation.

The detected first operation may be an operation performed by the user for adjusting the shape of the first foldable screen, such as folding or unfolding the flexible screen of the handset. Because the first foldable screen is flexible, it can be bent within a certain range under the action of the first operation. That is, when the first foldable screen is bent, the arc into which the screen is formed may be in a certain range of arc angle, for example, from 0 to $\pi/2$.

Specifically, the first electronic device may control the first foldable screen in real time according to the corresponding operation information to form a corresponding shape, such as an arc having an arc angle of $\pi/4$. It shall be noted that the first operation may be repeated adjustments of the shape of the first foldable screen which are performed by the user for achieving a good viewing effect. For example, if the image property of the first image on the curved screen television is sport event for which an arc angle of $\pi/6$ is optimal and the displaying effect after the flexible foldable screen of the handset is adjusted at the first time to an arc having an arc angle of $\pi/4$ is found to be poor, then the arc angle may be adjusted at the second time from $\pi/4$ to $\pi/6$ in order to fit the displayed content better.

Further, if it is determined that the first operation has been completed, then the first shape parameter can be detected. The first shape parameter may refer to an arc angle, an arc length, etc. of the curvature of the first foldable screen when the first foldable screen is in the first shape. This process involves but is not limited to the following two cases.

In the first case, a triggering operation on a specific key (for example, a click on the enter key) is detected within a first predetermined time period after the first operation. Then, it can be determined that the user has completed the adjustment of the first foldable screen, and the first shape into which the first foldable screen is formed and the corresponding first shape parameter can be detected. The first predetermined time period may be set before the first electronic device leaves the factory. For example, it may be set to 0-5 seconds, 5-10 seconds, etc., depending on circumstances. The present disclosure is not limited in this regard.

For example, if it is detected at a first time that the user bends the flexible screen of the handset to an arc angle of $\pi/6$ and a click on a first specific button or opinion is detected at a second time after the first time, then the current shape of the flexible screen can be determined as the first shape and its corresponding control parameter is the first shape parameter.

In the second case, neither an adjustment of the first foldable screen nor a click on the enter key is detected within the first predetermined time after the first operation. Then, the current shape of the first foldable screen is determined as the first shape by default, and the corresponding first shape parameter is determined. The adjustment may be the same as the first operation. For example, if no operation is detected within 5 seconds after the user adjusted the handset screen two times consecutively, then it can be confirmed that the adjustment has been completed and the current shape parameter of the first foldable screen can be detected.

For example, if the user adjusts the flexible screen of the handset two times so that its arc angle is $\pi/4$ at a first time and if neither an adjustment of the flexible screen of the handset nor a confirming operation on a specific key or opinion is detected within a first time period (for example, 0-5 seconds) after the first time, then the current control parameter for the flexible screen is determined as the first shape parameter by default.

At step 12, the first shape parameter is transmitted to the second electronic device coupled to the first electronic device, so as to allow the second electronic device to adjust the shape of the second foldable screen of the second electronic device based on the first shape parameter; or first synchronization information is generated based on the first shape parameter and the first synchronization information is transmitted to the second electronic device coupled to the first electronic device, so as to allow the second electronic device to adjust the shape of the second foldable screen based on the first synchronization information.

In the embodiment of the disclosure, there is a relationship between shape parameters of the foldable screens of the two electronics devices. The relationship between the shape parameters may be determined based on a difference between screen sizes of the first foldable screen and the second foldable screen. For example, if the flexible screen of the handset has a size of 5 inches and the flexible screen of the curved screen television has a size of 46 inches, then an association ratio may be set based on the difference between the two screen sizes. Based on the association ratio, a corresponding shape parameter of the second foldable screen can be determined readily and conveniently. For example, if the association ratio is 10%, then it can be determined based on the association ratio that the second arc angle of the curved screen television is 1.1 times greater than the first arc angle of the curvature of the handset flexible screen. For instance, when the arc angle of the curvature of the handset is 10 degrees, the corresponding arc angle of the curvature of the television is 11 degrees.

Generally speaking, the association ratio may increase as the difference in size increases. That is, if the size of the handset screen is fixed, then the larger the size of the curved screen television is, the greater the association ratio is. For example, the association ratio may be increased to 15%, 20% and so on.

In the embodiment of the disclosure, the second foldable screen of the second electronic device may be adjusted based on the first shape parameter in the following two manners.

In the first manner, the first electronic device directly transmits the first shape parameter to the second electronic device, which processes and analyzes the first shape parameter, calculates a corresponding shape parameter and adjusts the shape of the second foldable screen accordingly.

For example, after the user adjusts the flexible screen of the handset to a first shape with a first arc angle of 20 degrees, the handset can transmit the arc angle and its own size to the curved screen television, which in turn determines an appropriate arc angle of the curved screen television, based on the relationship between sizes of the television and the handset, as for example 24 degrees.

In the second manner, the first electronic device determines a second shape parameter which corresponds to the first shape parameter and matches the second foldable screen, based on the relationship between shape parameters of the first electronic device and the second electronic device; then generates the first synchronization information including the second shape parameter; and next transmits the first synchronization information to the second electronic device, so as to allow the second electronic device to adjust the shape of the second foldable screen based on the second shape parameter.

For example, if the first shape parameter of the handset flexible screen is determined as an arc angle of 20 degrees, then the corresponding second shape parameter may be determined as an arc angle of 24 degrees based on the relationship between shape parameters of the handset and the curved screen television. Next, synchronization information including the second shape parameter may be generated and transmitted to the curved screen television, so that the curved screen television can adjust its current arc angle to the arc angle of 24 degrees included in the synchronization information.

In the embodiment of the disclosure, after the first electronic device detects the first shape parameter, the foldable screen of the second electronic device can be adjusted based on the first shape parameter. That is, after the user adjusts the screen of the handset to an arc angle suitable for viewing content, it is possible for the screen of the television to automatically bend at a corresponding arc angle by means of synchronization without being adjusted repeatedly.

Second Embodiment

Figure 2:
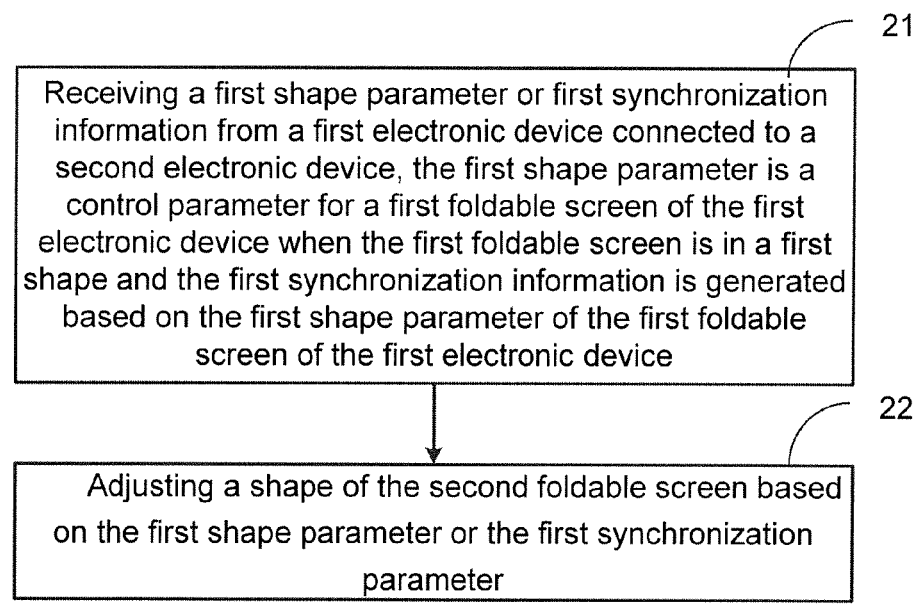
FIG. 2 is a flowchart illustrating an adjusting method according to a second embodiment of the disclosure.

Referring to FIG. 2, the embodiment provides an adjusting method applied to a second electronic device which has a second foldable screen. The method comprises:

at step 21, receiving a first shape parameter or first synchronization information from a first electronic device coupled to the second electronic device, wherein the first shape parameter is a control parameter for a first foldable screen of the first electronic device when the first foldable screen is in a first shape and the first synchronization information is generated based on the first shape parameter of the first foldable screen of the first electronic device.

In the embodiment of the disclosure, the second electronic device may refer to a large electronic product with a flexible screen, such as a curved screen television. Optionally, the second foldable screen of the second electronic device may be a flexible screen which employs the OLED display technology and is characterized by light weight, thinness, power saving and bendability. On the other hand, the first electronic device may refer to a small electronic device with a flexible screen, such as a flexible screen handset. In practice, the first electronic device and the second electronic device may be coupled with each other via a wireless network, such as Internet, WIFI, etc.

The first shape may refer to a curved shape into which the foldable screen is formed. The first shape parameter may refer to a control parameter for the flexible screen of the flexible screen handset when the screen is in the first shape, such as an arc angle (in radians or in degrees), an arc length, etc. of the curvature of the screen. The first shape parameter may even comprise the size of the flexible screen itself.

The first synchronization information may be information including a second shape parameter which corresponds to the first shape parameter and is applicable to the second foldable screen. The second shape parameter may be determined by the first based on a relationship between shape parameters of the first and the second electronic devices. Then, the first electronic device may generate the first synchronization information based on the second shape parameter and transmit the same to the second electronic device.

The relationship between the shape parameters of the two foldable screens may be determined in advance based on a difference between screen sizes of the first foldable screen and the second foldable screen. For example, if the flexible screen of the handset has a size of 5 inches and the flexible screen of the curved screen television has a size of 46 inches, then an association ratio may be set based on the difference between the two screen sizes. Based on the association ratio, a corresponding shape parameter of the second foldable screen can be determined readily and conveniently.

For example, if the association ratio is 20%, then it can be determined based on the association ratio that the second arc angle of the curved screen television is 1.2 times greater than the first arc angle of the curvature of the handset flexible screen. For instance, when the arc angle of the curvature of the handset is 10 degrees, the corresponding arc angle of the curvature of the television is 12 degrees. That is, the second shape parameter included in the synchronization information is the arc angle of 12 degrees.

Optionally, in the embodiment of the disclosure, before step 21, the following steps may be performed:

a. detecting a first image corresponding to a picture currently displayed by the second electronic device;

b. generating a first synchronization adjusting instruction, which includes at least the first image and a first image property of the first image;

c. transmitting the first synchronization adjusting instruction to the first electronic device.

The first image may be a displayed image corresponding to content currently displayed by the curved screen television (i.e., the second electronic device). In practice, the second electronic device may monitor, with its processor, one or more images currently displayed on its screen in real time or at a preset time interval. Then, it can acquire an image property of the displayed image, generate the first synchronization adjusting instruction and transmit the same to the first electronic device, so as to allow the first electronic device to display the first image on the first foldable screen.

Because a displaying property of the currently displayed content can be derived from the image property as, for example, natural scenery, sport event, stage performance, etc., it is also possible to recommend a reference parameter suitable for the currently displayed connection based on the displaying property and to output prompt information on the first electronic device so as to prompt the user to adjust the first foldable screen according to the reference parameter corresponding to the first image property.

For example, if the natural scenery is being displayed on the curved screen television, the recommended first reference parameter may be an arc angle of $\pi/6$. When the user adjusts the handset screen, he may see the recommended arc angle and operate accordingly. As such, the accuracy and efficiency of the adjustment can be improved, and the accuracy of the first shape parameter and the first synchronization information can also be improved.

At step 22, the shape of the second foldable screen is adjusted based on the first shape parameter or the first synchronization parameter.

In the embodiment of the disclosure, the second electronic device may adjust the second foldable screen based on the received information in the following two non-limiting manners.

In the first manner, the second shape parameter of the second foldable screen is determined based on the relationship between shape parameters of the first electronic device and the second electronic device and on the first shape parameter, and the shape of the second foldable screen is adjusted based on the second shape parameter. That is, the second electronic device determines an appropriate adjustment of the second foldable screen by processing and analyzing the received first shape parameter.

In the second manner, the second shape parameter of the second foldable screen included in the first synchronization information is acquired, and the shape of the second foldable screen is adjusted based on the second shape parameter. That is, the second electronic device adjusts the second foldable screen directly based on the shape parameter included in the received information.

Details of the above two manners can be obtained by referring to the examples and description in the first embodiment, and will not be redundantly described here.

In practice, the complete process of adjusting the second foldable screen by virtue of adjusting the first foldable screen may be performed in real time.

For example, if it is detected at the handset that there is an adjustment of its flexible screen, then after it is determined that the adjustment has been completed and the handset flexible screen is in a first shape with an arc angle of 20 degrees, the handset may directly transmit a first shape parameter corresponding to the first shape to the curved screen television. After receiving the first shape parameter, the curved screen television may determine, based on a relationship between shape parameters, a second shape parameter suitable for the television flexible screen as for example an arc angle of 24 degrees, so as to automatically bend or unfold the flexible screen of the curved screen television to 24 degrees.

Alternatively, after the handset determines the first shape parameter of its flexible screen being in the first shape, it may continue to determine, based on the relationship between shape parameters, the second shape parameter suitable for the flexible screen of the curved screen television connected to it and then generate synchronization information based on the parameter and transmits the same to the curved screen television. When the curved screen television receives the synchronization information over the wireless network, it can automatically adjust (for example, bend or unfold) its own flexible screen according to the shape parameter in the synchronization information, so that the adjustment is simple and fast.

According to the embodiment of the disclosure, the second electronic device adjusts the shape of its own foldable screen according to a shape parameter received from another electronic device, a user only needs to adjust the flexible screen of a handset or some other device coupled to a curved screen television when adjusting the arc angle of the curved screen of the curved screen television. After the handset flexible screen is adjusted to a good condition, it is possible to align the shape of the flexible screen of the curved screen television with the shape of the handset flexible screen simply by means of synchronization. Therefore, there is no need to directly adjust the flexible screen several times, and the damage to the large screen of the curved screen television is reduced.

Third Embodiment

Figure 3:
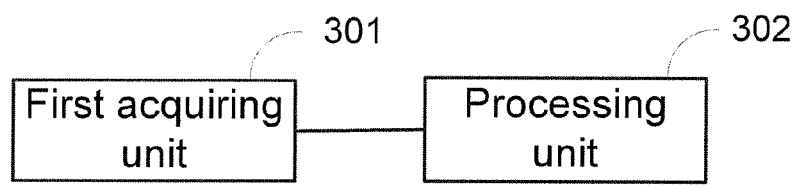
FIG. 3 is a diagram illustrating a structure of a first electronic device according to a third embodiment of the disclosure.

Referring to FIG. 3, the embodiment of the disclosure provides a first electronic device comprising a first foldable screen. The first electronic device comprises a first acquiring unit 301 and a processing unit 302.

The first acquiring unit 301 is configured to acquire a first shape parameter of the first foldable screen.

The processing unit 302 is configured to transmit the first shape parameter to a second electronic device coupled to the first electronic device, so as to allow the second electronic device to adjust a shape of a second foldable screen of the second electronic device based on the first shape parameter; or generate first synchronization information based on the first shape parameter and transmit the first synchronization information to the second electronic device coupled to the first electronic device, so as to allow the second electronic device to adjust the shape of the second foldable screen based on the first synchronization information.

Optionally, the first electronic device may further comprise: a receiving unit configured to receive a first synchronization adjusting instruction; and a second acquiring unit configured to acquire a first image of a picture currently displayed by the second electronic device based on the first synchronization adjusting instruction and display the first image on the first foldable screen.

Optionally, the first acquiring unit 301 may be configured to: detect a first operation for adjusting the shape of the first foldable screen of the first electronic device; and in response to the first operation, determine the first shape parameter of the first foldable screen being in a first shape, wherein the first shape is a curved shape into which the first foldable screen is formed under the action of the first operation.

Optionally, the processing unit 302 may be configured to:

determine a relationship between shape parameters of the first electronic device and the second electronic device;

determine a second shape parameter which corresponds to the first shape parameter and matches the second foldable screen, based on the relationship;

generate the first synchronization information including the second shape parameter;

transmit the first synchronization information to the second electronic device, so as to allow the second electronic device to adjust the shape of the second foldable screen based on the second shape parameter.

Fourth Embodiment

Figure 4:
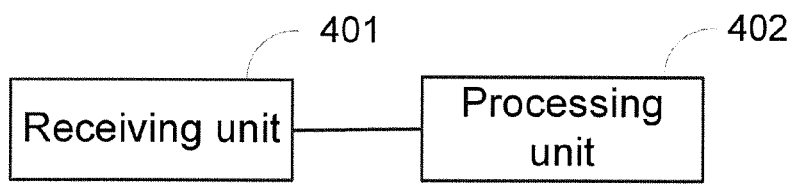
FIG. 4 is a diagram illustrating a structure of a second electronic device according to a fourth embodiment of the disclosure.

Referring to FIG. 4, the embodiment of the disclosure provides a second electronic device which has a second foldable screen, based on the same inventive concept. The second electronic device comprises a receiving unit 401 and a processing unit 402.

The receiving unit 401 is configured to receive a first shape parameter or first synchronization information from a first electronic device coupled to the second electronic device, wherein the first shape parameter is a control parameter for a first foldable screen of the first electronic device when the first foldable screen is in a first shape and the first synchronization information is generated based on the first shape parameter of the first foldable screen of the first electronic device.

The processing unit 402 is configured to adjust a shape of the second foldable screen based on the first shape parameter or the first synchronization parameter.

Optionally, the processing unit 402 may be specifically configured to:

determine a second shape parameter of the second foldable screen, based on a relationship between shape parameters of the first electronic device and the second electronic device and on the first shape parameter, and adjust the shape of the second foldable screen based on the second shape parameter, or acquire the second shape parameter of the second foldable screen included in the first synchronization information, and adjust the shape of the second foldable screen based on the second shape parameter.

Optionally, the second electronic device may further comprise:

a detecting unit configured to detect a first image corresponding to a picture currently displayed by the second electronic device;

a generating unit configured to generate a first synchronization adjusting instruction, which includes at least the first image and a first image property of the first image;

a transmitting unit configured to transmit the first synchronization adjusting instruction to the first electronic device.

In the embodiments of the disclosure, since both the electronic device and the second electronic device each have a foldable screen and the first electronic device and the second electronic device are coupled with each other, if the first electronic device transmits a first shape parameter of its first foldable screen to the second electronic device when it acquires the parameter, the second electronic device can adjust its second foldable screen accordingly. Alternatively, after acquiring the first shape parameter, the first electronic device may generate first synchronization information, which may include an adjusting parameter (such as an arc angle of curvature, etc.) for adjusting the second foldable screen, based on the first shape parameter. Then, the first electronic device transmits the first synchronization information to the second electronic device, so as to allow the second electronic device to adjust the shape of the second foldable screen based on the first synchronization information. As such, by acquiring the shape parameter of the foldable screen of the first electronic device, the foldable screen of the second electronic device can adjusted accordingly. Thus, when it is needed to adjust the curved screen of a curved screen television, the flexible screen of a handset coupled to the curved screen television is adjusted to an appropriate shape, and then based on a corresponding shape parameter the curved screen television is controlled to automatically adjust its curved screen to a corresponding shape, so that the curved screen television provides a good displaying effect for its user. In this manner, the adjustment produces an accurate result while the number of times the curved screen is directly adjusted is reduced, and therefore the efficiency of the adjustment is high.

To be specific, computer program instructions which correspond to an adjusting method according to an embodiment of the disclosure may be stored on a storage medium such as an optical disc, a hard disk, a USB disk, etc. When the computer program instructions in the storage medium which correspond to the adjusting method are read or executed by an electronic device, the following steps are performed:

acquiring a first shape parameter of the first foldable screen; and transmitting the first shape parameter to a second electronic device coupled to the first electronic device, so as to allow the second electronic device to adjust a shape of a second foldable screen of the second electronic device based on the first shape parameter, or generating first synchronization information based on the first shape parameter and transmitting the first synchronization information to the second electronic device coupled to the first electronic device, so as to allow the second electronic device to adjust the shape of the second foldable screen based on the first synchronization information.

Optionally, the storage medium may have some other computer instructions stored therein. These computer instructions are executed before those corresponding to the step of acquiring the first shape parameter of the first foldable screen of the first electronic device and cause the following steps to be performed:

receiving a first synchronization adjusting instruction;

acquiring a first image of a picture currently displayed by the second electronic device based on the first synchronization adjusting instruction, and displaying the first image on the first foldable screen Optionally, when the computer program instructions in the storage medium which correspond to the step of acquiring the first shape parameter of the first foldable screen are executed, the following steps are specifically performed:

detecting a first operation for adjusting the shape of the first foldable screen of the first electronic device;

in response to the first operation, determining the first shape parameter of the first foldable screen being in a first shape, wherein the first shape is a curved shape into which the first foldable screen is formed under the action of the first operation.

Optionally, when the computer program instructions in the storage medium which correspond to the step of generating the first synchronization information based on the first shape parameter and transmitting the first synchronization information to the second electronic device coupled to the first electronic device so as to allow the second electronic device to adjust the shape of the second foldable screen based on the first synchronization information are executed, the following steps are performed:

determining a relationship between shape parameters of the first electronic device and the second electronic device;

determining a second shape parameter which corresponds to the first shape parameter and matches the second foldable screen, based on the relationship;

generating the first synchronization information including the second shape parameter;

transmitting the first synchronization information to the second electronic device, so as to allow the second electronic device to adjust the shape of the second foldable screen based on the second shape parameter.

Obviously, those skilled in the art can make various alterations and changes to the disclosure without departing from the spirit and scope thereof. Thus, if these alterations and changes fall within the scope of the claims and the technical equivalents thereof, they are intended to be covered by the disclosure.

What is claimed is:

1. An adjusting method for a first electronic device, comprising:

acquiring a first image of a picture currently displayed by a second electronic device coupled to the first electronic device;

displaying the first image and a recommended arc angle of curvature corresponding to an image property of the first image on a first foldable screen of the first electronic device;

acquiring a first shape parameter of the first foldable screen associated with the recommended arc angle of curvature; and transmitting the first shape parameter to the second electronic device, so as to allow the second electronic device to adjust a shape of a second foldable screen of the second electronic device based on the first shape parameter, or generating first synchronization information based on the first shape parameter and transmitting the first synchronization information to the second electronic device coupled to the first electronic device, so as to allow the second electronic device to adjust the shape of the second foldable screen based on the first synchronization information.

2. The method according to claim 1, wherein the acquiring the first shape parameter of the first foldable screen comprises:

detecting a first operation for adjusting the shape of the first foldable screen of the first electronic device;

in response to the first operation, determining the first shape parameter of the first foldable screen being in a first shape, wherein the first shape is a curved shape into which the first foldable screen is formed under the action of the first operation.

3. The method according to claim 1, wherein the generating the first synchronization information comprises:

determining a relationship between shape parameters of the first electronic device and the second electronic device;

determining a second shape parameter which corresponds to the first shape parameter and matches the second foldable screen, based on the relationship;

generating the first synchronization information including the second shape parameter;

transmitting the first synchronization information to the second electronic device, so as to allow the second electronic device to adjust the shape of the second foldable screen based on the second shape parameter.

4. An adjusting method for a second electronic device, comprising:

transmitting a first image of a picture currently displayed on a second foldable screen of the second electronic device to a first electronic device coupled to the second electronic device;

receiving a first shape parameter or first synchronization information from the first electronic device, wherein the first shape parameter is a control parameter for a first foldable screen of the first electronic device when the first foldable screen is in a first shape, the first synchronization information is generated based on the first shape parameter of the first foldable screen of the first electronic device, and wherein the first shape parameter is associated with a recommended arc angle of curvature corresponding to an image property of the first image;

adjusting a shape of a second foldable screen of the second electronic device based on the first shape parameter or the first synchronization parameter.

5. The method according to claim 4, wherein the adjusting the shape of the second foldable screen based on the first shape parameter or the first synchronization parameter comprises:

determining a second shape parameter of the second foldable screen, based on a relationship between shape parameters of the first electronic device and the second electronic device and on the first shape parameter, and adjusting the shape of the second foldable screen based on the second shape parameter, or acquiring the second shape parameter of the second foldable screen included in the first synchronization information, and adjusting the shape of the second foldable screen based on the second shape parameter.

6. The method according to claim 4, further comprising: before receiving the first shape parameter or the first synchronization information from the first electronic device coupled to second electronic device, detecting a first image corresponding to a picture currently displayed by the second electronic device;

generating a first synchronization adjusting instruction, which includes at least the first image and a first image property of the first image;

transmitting the first synchronization adjusting instruction to the first electronic device.

7. A first electronic device including a first foldable screen, the first electronic device comprising:

a first acquiring unit configured to acquire a first image of a picture currently displayed by a second electronic device coupled to the first electronic device;

a display unit configured to display the first image and a recommended arc angle of curvature corresponding to an image property of the first image on the first foldable screen;

a second acquiring unit configured to acquire a first shape parameter of the first foldable screen associated with the recommended arc angle of curvature; and a processing unit configured to transmit the first shape parameter to the second electronic device coupled to the first electronic device, so as to allow the second electronic device to adjust a shape of a second foldable screen of the second electronic device based on the first shape parameter, or generate first synchronization information based on the first shape parameter and transmit the first synchronization information to the second electronic device coupled to the first electronic device, so as to allow the second electronic device to adjust the shape of the second foldable screen based on the first synchronization information.

8. The first electronic device according to claim 7, wherein the second acquiring unit is configured to:

detect a first operation for adjusting the shape of the first foldable screen of the first electronic device;

in response to the first operation, determine the first shape parameter of the first foldable screen being in a first shape, wherein the first shape is a curved shape into which the first foldable screen is formed under the action of the first operation.

9. The first electronic device according to claim 8, wherein the processing unit is configured to:

determine a relationship between shape parameters of the first electronic device and the second electronic device;

determine a second shape parameter which corresponds to the first shape parameter and matches the second foldable screen, based on the relationship;

generate the first synchronization information including the second shape parameter;

transmit the first synchronization information to the second electronic device, so as to allow the second electronic device to adjust the shape of the second foldable screen based on the second shape parameter.

10. A second electronic device including a second foldable screen, the second electronic device comprising:

a transmitting unit configured to transmit a first image of a picture currently displayed on the second foldable screen of the second electronic device to a first electronic device coupled to the second electronic device;

a receiving unit configured to receive a first shape parameter or first synchronization information from the first electronic device, wherein the first shape parameter is a control parameter for a first foldable screen of the first electronic device when the first foldable screen is in a first shape, the first synchronization information is generated based on the first shape parameter of the first foldable screen of the first electronic device, and wherein the first shape parameter is associated with a recommended arc angle of curvature corresponding to an image property of the first image;

a processing unit configured to adjust a shape of the second foldable screen based on the first shape parameter or the first synchronization parameter.

11. The second electronic device according to claim 10, wherein the processing unit is configured to:

determine a second shape parameter of the second foldable screen, based on a relationship between shape parameters of the first electronic device and the second electronic device and on the first shape parameter, and adjust the shape of the second foldable screen based on the second shape parameter, or acquire the second shape parameter of the second foldable screen included in the first synchronization information, and adjust the shape of the second foldable screen based on the second shape parameter.

12. The second electronic device according to claim 10, further comprising:

a detecting unit configured to detect a first image corresponding to a picture currently displayed by the second electronic device;

a generating unit configured to generate a first synchronization adjusting instruction, which includes at least the first image and a first image property of the first image;

a transmitting unit configured to transmit the first synchronization adjusting instruction to the first electronic device.

* * * * *